US012619320B2

(12) United States Patent
Yan et al.

(10) Patent No.: US 12,619,320 B2
(45) Date of Patent: May 5, 2026

(54) MOTION-MODEL BASED TRACKING OF ARTIFICIAL REALITY INPUT DEVICES TO ENHANCE CAMERA-BASED TRACKING

(71) Applicant: Meta Platforms Technologies, LLC, Menlo Park, CA (US)

(72) Inventors: Chengyuan Yan, San Bruno, CA (US); Sheng Shen, Shoreline, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 113 days.

(21) Appl. No.: 18/618,421

(22) Filed: Mar. 27, 2024

(65) Prior Publication Data

US 2024/0370099 A1     Nov. 7, 2024

Related U.S. Application Data

(60) Provisional application No. 63/499,263, filed on May 1, 2023.

(51) Int. Cl.
*G06F 3/0346* (2013.01)
*G06T 7/277* (2017.01)
*G06T 7/70* (2017.01)

(52) U.S. Cl.
CPC ............ *G06F 3/0346* (2013.01); *G06T 7/277* (2017.01); *G06T 7/70* (2017.01); *G06T 2207/10016* (2013.01)

(58) Field of Classification Search
CPC ....... G06F 3/0346; G06F 3/012; G06T 7/277; G06T 7/70; G06T 2207/10016
See application file for complete search history.

(56) References Cited

U.S. PATENT DOCUMENTS 5,649,061 A     7/1997   Smyth
6,025,608 A     2/2000   Harris et al.
         (Continued)

FOREIGN PATENT DOCUMENTS

CN        102591459 A     7/2012
JP          5083992 B1    11/2012
         (Continued)

OTHER PUBLICATIONS

"HandPosing: A Tool for Quickly Snapping Hands to Objects in VR Using Hand-Tracking," HandPosing: Class List [online], Retrieved on Feb. 23, 2021, 2 pages, Retrieved from the Internet: URL: https://mephestokhaan.github.io/HandPosing/Documentation/html/annotated.html.

(Continued)

*Primary Examiner* — David D Davis
(74) *Attorney, Agent, or Firm* — Greenberg Traurig, LLP

(57) ABSTRACT

Example implementations are for tracking an artificial reality input device by receiving, for the input device, video tracking data and inertial motion unit ("IMU") data based on motion input. Example implementations generate, from the video tracking data, a video tracking position and a video tracking velocity; generate, from the IMU data, an IMU orientation and an IMU linear acceleration; and generate, from the IMU orientation and the IMU linear acceleration, an IMU linear velocity. Example implementations determine if the video tracking position and the video tracking velocity is reliable and determine, by a Kalman filter for the input device, a current bias, a current velocity and a current position.

20 Claims, 10 Drawing Sheets

(56) References Cited

U.S. PATENT DOCUMENTS

| | | | |
|---|---|---|---|
| 6,028,608 | A | 2/2000 | Jenkins |
| 6,070,098 | A | 5/2000 | Moore-Ede et al. |
| 9,406,211 | B2 | 8/2016 | Sahiholnasab et al. |
| 9,763,614 | B2 | 9/2017 | Geller et al. |
| 9,767,609 | B2 | 9/2017 | Eade et al. |
| 9,983,665 | B2 | 5/2018 | Hall |
| 10,453,431 | B2 | 10/2019 | El-Ghoroury |
| 10,567,641 | B1 | 2/2020 | Rueckner |
| 11,158,074 | B1 | 10/2021 | Kantor et al. |
| 11,238,340 | B1 | 2/2022 | Anderson et al. |
| 11,327,630 | B1 | 5/2022 | Khan et al. |
| 11,610,376 | B1 | 3/2023 | Smith et al. |
| 11,875,604 | B1 | 1/2024 | Abad et al. |
| 11,941,830 | B2 | 3/2024 | Kantor et al. |
| 11,978,169 | B2 | 5/2024 | Smith et al. |
| 2006/0098865 | A1 | 5/2006 | Yang et al. |
| 2007/0112277 | A1 | 5/2007 | Fischer et al. |
| 2012/0056982 | A1 | 3/2012 | Katz et al. |
| 2012/0143358 | A1 | 6/2012 | Adams et al. |
| 2012/0249741 | A1 | 10/2012 | Maciocci et al. |
| 2013/0084805 | A1 | 4/2013 | Pasquero et al. |
| 2014/0171775 | A1 | 6/2014 | Kilsgaard et al. |
| 2014/0240492 | A1 | 8/2014 | Lee |
| 2014/0327626 | A1 | 11/2014 | Harrison et al. |
| 2015/0172622 | A1 | 6/2015 | Yoon et al. |
| 2015/0220768 | A1 | 8/2015 | Ronnecke et al. |
| 2015/0338915 | A1 | 11/2015 | Publicover et al. |
| 2016/0057340 | A1 | 2/2016 | You et al. |
| 2016/0116336 | A1 | 4/2016 | Zhao et al. |
| 2016/0119523 | A1 | 4/2016 | Egger et al. |
| 2016/0198949 | A1 | 7/2016 | Spitzer |
| 2016/0335790 | A1 | 11/2016 | Fleishman et al. |
| 2017/0113057 | A1 | 4/2017 | Goodall et al. |
| 2017/0123492 | A1 | 5/2017 | Marggraff et al. |
| 2017/0148215 | A1 | 5/2017 | Aksoy et al. |
| 2017/0156192 | A1 | 6/2017 | Chern et al. |
| 2017/0200266 | A1 | 7/2017 | Podilchuk et al. |
| 2017/0277257 | A1 | 9/2017 | Ota et al. |
| 2017/0285169 | A1 | 10/2017 | Holz |
| 2017/0287447 | A1 | 10/2017 | Barry et al. |
| 2017/0293356 | A1 | 10/2017 | Khaderi et al. |
| 2017/0303847 | A1 | 10/2017 | Drucker |
| 2017/0357334 | A1* | 12/2017 | Balan ................. G02B 27/0172 |
| 2018/0048880 | A1 | 2/2018 | Trail et al. |
| 2018/0073873 | A1 | 3/2018 | Takao et al. |
| 2018/0112862 | A1 | 4/2018 | Gammons et al. |
| 2018/0125423 | A1 | 5/2018 | Chang et al. |
| 2018/0131911 | A1 | 5/2018 | Mizuno |
| 2018/0133507 | A1 | 5/2018 | Malchano et al. |
| 2018/0134217 | A1 | 5/2018 | Peterson et al. |
| 2018/0196511 | A1 | 7/2018 | Chae |
| 2018/0297511 | A1 | 10/2018 | Park et al. |
| 2018/0299953 | A1 | 10/2018 | Selker et al. |
| 2018/0307303 | A1 | 10/2018 | Powderly et al. |
| 2018/0335855 | A1 | 11/2018 | Erivantcev et al. |
| 2018/0348863 | A1 | 12/2018 | Aimone et al. |
| 2019/0045173 | A1 | 2/2019 | Hicks |
| 2019/0065027 | A1 | 2/2019 | Hauenstein et al. |
| 2019/0082112 | A1 | 3/2019 | Qian |
| 2019/0174237 | A1 | 6/2019 | Lunner et al. |
| 2019/0179526 | A1 | 6/2019 | Yellen |
| 2019/0325274 | A1* | 10/2019 | Balan .................... G06F 3/0346 |
| 2019/0325600 | A1* | 10/2019 | Balan ..................... G06F 3/011 |
| 2019/0365272 | A1 | 12/2019 | Sadeghian-Motahar et al. |
| 2020/0005026 | A1 | 1/2020 | Andersen et al. |
| 2020/0202538 | A1 | 6/2020 | Hsu et al. |
| 2020/0409489 | A1 | 12/2020 | Munemoto et al. |
| 2021/0012574 | A1 | 1/2021 | Fu et al. |
| 2021/0029290 | A1 | 1/2021 | Okuike |
| 2021/0035326 | A1 | 2/2021 | Koike et al. |
| 2021/0049360 | A1* | 2/2021 | Yildiz ................. G02B 27/017 |
| 2021/0090331 | A1 | 3/2021 | Ravasz et al. |
| 2021/0124417 | A1 | 4/2021 | Ma |
| 2021/0161266 | A1 | 6/2021 | Brown et al. |
| 2021/0165486 | A1 | 6/2021 | Erivantcev et al. |

| | | | |
|---|---|---|---|
| 2021/0235203 | A1 | 7/2021 | Lunner et al. |
| 2022/0028406 | A1 | 1/2022 | Burmistrov et al. |
| 2022/0253808 | A1 | 8/2022 | Ferguson et al. |
| 2022/0308655 | A1 | 9/2022 | Zhu et al. |
| 2022/0319041 | A1 | 10/2022 | Jiang et al. |
| 2023/0065296 | A1 | 3/2023 | Khaleghimeybodi et al. |
| 2023/0079929 | A1 | 3/2023 | Bradski et al. |
| 2023/0185386 | A1 | 6/2023 | Bosworth |
| 2024/0029329 | A1 | 1/2024 | Steptoe et al. |
| 2024/0193799 | A1 | 6/2024 | Kantor et al. |
| 2024/0273840 | A1 | 8/2024 | Smith et al. |
| 2025/0181173 | A1 | 6/2025 | Nizamudeen Basha et al. |

FOREIGN PATENT DOCUMENTS

| | | | |
|---|---|---|---|
| WO | WO-2014028251 | A1 | 2/2014 |
| WO | WO-2016180702 | A1 | 11/2016 |
| WO | WO-2017035498 | A1 | 3/2017 |
| WO | WO-2023041181 | A1 | 3/2023 |

OTHER PUBLICATIONS

Mefisto L., "Grabbables—MephestoKhaan / HandPosing Wiki," GitHub [online], Dec. 29, 2020 [Retrieved on Feb. 23, 2021], 3 pages, Retrieved from the Internet: URL: https://github.com/MephestoKhaan/HandPosing/wiki/Grabbables.

Mefisto L., "Hand Puppeting—MephestoKhaan/HandPosing Wiki," GitHub [online], Nov. 23, 2020 [Retrieved on Feb. 23, 2021], 3 pages, Retrieved from the Internet: URL: https://github.com/MephestoKhaan/HandPosing/wiki/Hand-Puppeting.

Mefisto L., "Home—MephestoKhaan / HandPosing Wiki," GitHub [online], Dec. 29, 2020 [Retrieved on Feb. 23, 2021], 3 pages, Retrieved from the Internet: URL: https://github.com/MephestoKhaan/HandPosing/wiki.

Mefisto L., "Snapping Behaviours—MephestoKhaan/HandPosing Wiki," GitHub [online], Dec. 29, 2020 [Retrieved on Feb. 23, 2021], 7 pages, Retrieved from the Internet: URL: https://github.com/MephestoKhaan/HandPosing/wiki/Snapping-Behaviours.

Mefisto L., "Pose Recording—MephestoKhaan/HandPosing Wiki," GitHub [online], Dec. 29, 2020 [Retrieved on Feb. 23, 2021], 10 pages, Retrieved from the Internet: URL: https://github.com/MephestoKhaan/HandPosing/wiki/Pose-Recording.

Mefisto L., "Puppeting Oculus Avatars—MephestoKhaan/HandPosing Wiki," GitHub [online], Dec. 29, 2020 [Retrieved on Feb. 23, 2021], 2 pages, Retrieved from the Internet: URL: https://github.com/MephestoKhaan/HandPosing/wiki/Puppeting-Oculus-Avatars.

"MephestoKhaan/HandPosing: Pose authoring using handtrackingon Quest," MIT License, GitHub [online], Retrieved on Feb. 24, 2021, 4 pages, Retrieved from the Internet: URL: https://github.com/MephestoKhaan/HandPosing.

Wikipedia., "Normalization," Jan. 2, 2021, Retrieved from the Internet: https://en.wikipedia.org/w/index.php?title=Normalization_(statistics) oldid=997823157, 3 pages.

International Preliminary Report on Patentability for International Application No. PCT/US2024/027119, mailed Nov. 13, 2025, 9 pages.

International Search Report and Written Opinion for International Application No. PCT/US2024/027119, mailed Aug. 20, 2024, 12 pages.

Akhter I., et al., "Pose-Conditioned Joint Angle Limits for 3D Human Pose Reconstruction," Proceedings of the IEEE Conference on Computer Vision and Pattern Recognition (CVPR), Jun. 7-12, 2015, pp. 1446-1455.

Baluja S., et al., "Non-Intrusive Gaze Tracking Using Artificial Neural Networks," Jan. 1994, pp. 1-14.

Becher A., et al., "VIRTOOAIR: Virtual Reality TOOlbox for Avatar Intelligent Reconstruction," 2018 IEEE International Symposium on Mixed and Augmented Reality Adjunct (ISMAR—Adjunct), Oct. 16, 2018, [Retrieved on Apr. 25, 2019], pp. 275-279.

"Blender: Free and Open 3D Creation Software," Retrieved on Oct. 15, 2021, 9 Pages, Retrieved from the Internet: URL: https://www.blender.org.

(56) References Cited

OTHER PUBLICATIONS

Bobick A.F., et al., "The Recognition of Human Movement Using Temporal Templates," IEEE Transactions on Pattern Analysis and Machine Intelligence, Mar. 1, 2001, vol. 23, No. 3, pp. 257-267.

Bradski G.R., et al., "Motion Segmentation and Pose Recognition with Motion History Gradients," Machine Vision and Applications, Jul. 31, 2002, vol. 13, No. 3, pp. 174-184.

Campana A. et al., "An Artificial Neural Network That Uses Eye-Tracking Performance to Identify Patients with Schizophrenia," Schizophrenia Bulletin, vol. 25, No. 4, Jan. 1999, pp. 789-799.

Cao Z., et al., "OpenPose: Realtime Multi-Person 2D Pose Estimation Using Part Affinity Fields," arXiv preprint, arXiv: 1812. 08008V2, May 30, 2019, 14 pages.

Cha Y.W., et al., "Towards Fully Mobile 3D Face, Body, and Environment Capture Using Only Head-Worn Cameras," IEEE Transactions on Visualization and Computer Graphics, 2018, vol. 24, No. 11, 12 Pages.

CMU: "Motion Caption Dataset: CMU Graphics Lab Motion Capture Database," Retrieved on Oct. 15, 2021, 1 Page, Retrieved from the Internet: URL: http://mocap.cs.cmu.edu.

European Search Report for European Patent Application No. 24197770.1, dated Feb. 21, 2025, 6 pages.

Final Office Action mailed Nov. 1, 2023 for U.S. Appl. No. 17/461,769, filed Aug. 30, 2021, 29 pages.

Final Office Action mailed May 14, 2025 for U.S. Appl. No. 18/635,490, filed Apr. 15, 2024, 23 pages.

He K., et al., "Mask R-CNN," In Proceedings of the IEEE International Conference on Computer Vision, Oct. 2017, pp. 2961-2969.

Hwang D.H., et al., "MonoEye: Multimodal Human Motion Capture System Using a Single Ultra-Wide Fisheye Camera," Proceedings of the 33rd Annual ACM Symposium on User Interface Software and Technology, Oct. 2020, pp. 98-111.

Hwang D-H., et al., "Toward Human Motion Capturing With an Ultra-Wide Fisheye Camera on the Chest," IEEE Conference on Virtual Reality and 3D User Interfaces (VR), Mar. 23-27, 2019, pp. 1524-1526.

International Preliminary Report on Patentability for International Application No. PCT/US2022/041777, mailed Mar. 14, 2024, 14 pages.

International Preliminary Report on Patentability for International Application No. PCT/US2023/033555, mailed May 1, 2025, 14 pages.

International Search Report and Written Opinion for International Application No. PCT/US2018/062029, mailed Jul. 2, 2019, 11 Pages.

International Search Report and Written Opinion for International Application No. PCT/US2022/022282, mailed Jul. 25, 2022, 13 pages.

International Search Report and Written Opinion for International Application No. PCT/US2022/041777, mailed Feb. 13, 2023, 18 pages.

International Search Report and Written Opinion for International Application No. PCT/US2023/033555, mailed Jan. 23, 2024, 17 pages.

International Search Report and Written Opinion for International Application No. PCT/US2024/057188, mailed Apr. 14, 2025, 13 pages.

Invitation to Pay Additional Fees for International Application No. PCT/US2022/041777, mailed Dec. 21, 2022, 12 pages.

Jiang H., et al., "Seeing Invisible Poses: Estimating 3D Body Pose From Egocentric Video," IEEE Conference on Computer Vision and Pattern Recognition (CVPR), 2017, pp. 3501-3509.

Jiang H., et al., "Egocentric Pose Estimation from Human Vision Span," IEEE/CVF International Conference on Computer Vision (ICCV), Oct. 10, 2021, pp. 10986-10994.

Kanazawa A., et al., "End-to-end Recovery of Human Shape and Pose," Computer Vision and Pattern Recognition (CVPR), Jun. 2018, pp. 7122-7131.

Lopez A., et al., "Development of an EOG-Based System to Control a Serious Game," Measurement, vol. 127, Jun. 15, 2018, 8 pages.

Marcard T., et al., "Sparse Inertial Poser: Automatic 3D Human Pose Estimation From Sparse IMUs," Computer Graphics Forum, Wiley Online Library, 2017, vol. 36, No. 2, pp. 349-360.

Martinez J., et al., "A Simple yet Effective Baseline for 3D Human Pose Estimation," Proceedings of the IEEE International Conference on Computer Vision (ICCV), Oct. 2017, pp. 2640-2649.

Moreno-Noguer F., "3D Human Pose Estimation from a Single Image via Distance Matrix Regression," Proceedings of the IEEE Conference on Computer Vision and Pattern Recognition (CVPR), 2017, pp. 2823-2832.

Ng E., et al., "You2Me: Inferring Body Pose in Egocentric Video via First and Second Person Interactions," Conference on Computer Vision and Pattern Recognition (CVPR), 2020, pp. 9890-9900.

Non-Final Office Action mailed Jun. 6, 2023 for U.S. Appl. No. 17/461,769, filed Aug. 30, 2021, 27 pages.

Non-Final Office Action mailed Aug. 13, 2021 for U.S. Appl. No. 15/802,333, filed Nov. 2, 2017, 41 pages.

Non-Final Office Action mailed Oct. 2, 2023 for U.S. Appl. No. 17/554,522, filed Dec. 17, 2021, 59 pages.

Office Action mailed Jul. 23, 2025 for Taiwan Application No. 111106046, filed Feb. 18, 2022, 11 pages.

Office Action mailed Jul. 24, 2025 for Chinese Application No. 202280027504.5, filed Oct. 9, 2023, 10 pages.

Pavlakos G., et al., "Coarse-to-Fine Volumetric Prediction for Single-Image 3D Human Pose," IEEE Conference on Computer Vision and Pattern Recognition (CVPR), 2017, pp. 7025-7034.

Rhodin; et al., "EgoCap: Egocentric Marker-Less Motion Capture with Two Fisheye Cameras." ACM Transactions on Graphics (TOG), Dec. 5, 2016, vol. 35, No. 6, 11 pages.

Rhodin; et al., "General Automatic Human Shape and Motion Capture Using Volumetric Contour Cues," Proceedings of the 14th European Conference on Computer Vision 2016, Oct. 11, 2016, 19 pages.

Rogez G., et al., "First-Person Pose Recognition Using Egocentric Workspaces," IEEE Conference on Computer Vision and Pattern Recognition (CVPR), 2015, pp. 4325-4333.

Rokoko: "Smartsuit Pro: Quality Motion Capture in One Simple Suit," Retrieved on Oct. 15, 2021, 7 Pages, Retrieved from the Internet: URL: https://www.rokoko.com/products/smartsuit-pro.

Schneider N. et al., "An Open-Source Low-Cost Eye-Tracking System for Portable Real-Time and Offline Tracking," May 26-27, 2011, 4 pages.

Shiratori T., et al., "Motion Capture from Body-Mounted Cameras," ACM Transactions on Graphics (TOG), Jul. 2011, vol. 30, No. 4, Article 31, pp. 31:1-31:10.

Sumikura S., et al., "OpenVSLAM : A Versatile Visual SLAM Framework," Open Source Software Competition, Oct. 2019, pp. 22922295.

Tekin B., et al., "Structured Prediction of 3D Human Pose With Deep Neural Networks," British Machine Vision Conference (BMVC), 2016, 11 pages.

Tome D., et al., "SelfPose: 3D Egocentric Pose Estimation From a Headset Mounted Camera," IEEE Transactions on Pattern Analysis and Machine Intelligence, 2020, 13 pages.

Tome D., et al., "xR-EgoPose: Egocentric 3D Human Pose From an HMD Camera," International Conference on Computer Vision (ICCV), 2019, pp. 7728-7738.

Tu H., et al., "VoxelPose: Towards Multi-Camera 3D Human Pose Estimation in Wild Environment," European Conference on Computer Vision (ECCV), Nov. 3, 2020, 17 Pages.

U.S. Appl. No. 62/239,111, 2016, 32 Pages.

Villanueva A., et al., "A Novel Gaze Estimation System with One Calibration Point," IEEE Transactions on Systems, Man, and Cybernetics, Part B (Cybernetics), Aug. 2008, vol. 38, No. 04, pp. 1123-1138.

Wu E., et al., "Back-Hand-Pose 3D Hand Pose Estimation for a Wrist-worn Camera via Dorsum Deformation Network," Proceedings of the 33rd Annual ACM Symposium on User Interface Software and Technology, Oct. 20, 2020, pp. 1147-1160.

(56) References Cited

OTHER PUBLICATIONS

Xu W., et al., "Mo2Cap2: Real-Time Mobile 3D Motion Capture with a Cap-Mounted Fisheye Camera," IEEE Transactions on Visualization and Computer Graphics, Feb. 15, 2019, vol. 25, No. 5, 9 Pages.

Yonemoto H., et al., "Egocentric Articulated Pose Tracking for Action Recognition," International Conference on Machine Vision Applications (MVA), 2015, pp. 98-101.

Yuan Y., et al., "3D Ego-Pose Estimation via Imitation Learning," Proceedings of European Conference on Computer Vision (ECCV), 2018, pp. 1-16.

Yuan Y., et al., "Ego-Pose Estimation and Forecasting as Real-Time PD Control," International Conference on Computer Vision (ICCV), 2019, pp. 10082-10092.

Zhou B., et al., "Scene Parsing Through ADE20K Dataset," In Conference on Computer Vision and Pattern Recognition, Jul. 2017, pp. 5122-5130.

Zhou X., et al., "Deep Kinematic Pose Regression," European Conference on Computer Vision, Nov. 24, 2016, pp. 186-201.

Office Action mailed Oct. 14, 2025 for Japanese Patent Application No. 2023-547420, filed on Mar. 29, 2022, 3 pages.

* cited by examiner

100

101
102
103

$$x = [p \; v \; b]^T$$

$$x_k = F \times x_{k-1} + G \times a_k$$

$$F = \begin{bmatrix} 1 & dt & -\frac{1}{2}dt^2 \times R \\ 1 & 1 & -dt \times R \\ & & 1 \end{bmatrix}$$

$$G = \begin{bmatrix} \frac{1}{2}dt^2 \\ dt \\ 0 \end{bmatrix}$$

MOTION-MODEL BASED TRACKING OF ARTIFICIAL REALITY INPUT DEVICES TO ENHANCE CAMERA-BASED TRACKING

CROSS-REFERENCE TO RELATED APPLICATIONS

This application claims priority to U.S. Patent Application No. 63/499,263, filed May 1, 2023 and titled "MOTION-MODEL BASED TRACKING OF ARTIFICIAL REALITY INPUT DEVICES," which is herein incorporated by reference in its entirety.

TECHNICAL FIELD

The present disclosure is directed to motion tracking of computer based input devices.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). During operation, the user may utilize a hand-held controller or other input device to interact with applications or interact with the artificial reality system. Aspects of graphical elements within the artificial reality content may be determined based on the position and orientation of the input device.

BRIEF SUMMARY OF THE INVENTION

The present disclosure is generally directed to tracking of artificial reality input devices. In some implementations, tracking an artificial reality input device may include receiving video tracking data and inertial motion unit (IMU) data to determine a video tracking position, a video tracking velocity, an IMU orientation, an IMU linear acceleration, and an IMU linear velocity. If the video tracking position and the video tracking velocity are below a reliability threshold, the IMU linear velocity, the IMU orientation, and the IMU linear acceleration may be with a Kalman filter and a last known video tracking position to determine a current bias, a current velocity and a current position for the input device. By using the IMU data as described, the systems and methods provided herein may advantageously allow motion-model based tracking when camera-based tracking is unreliable.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
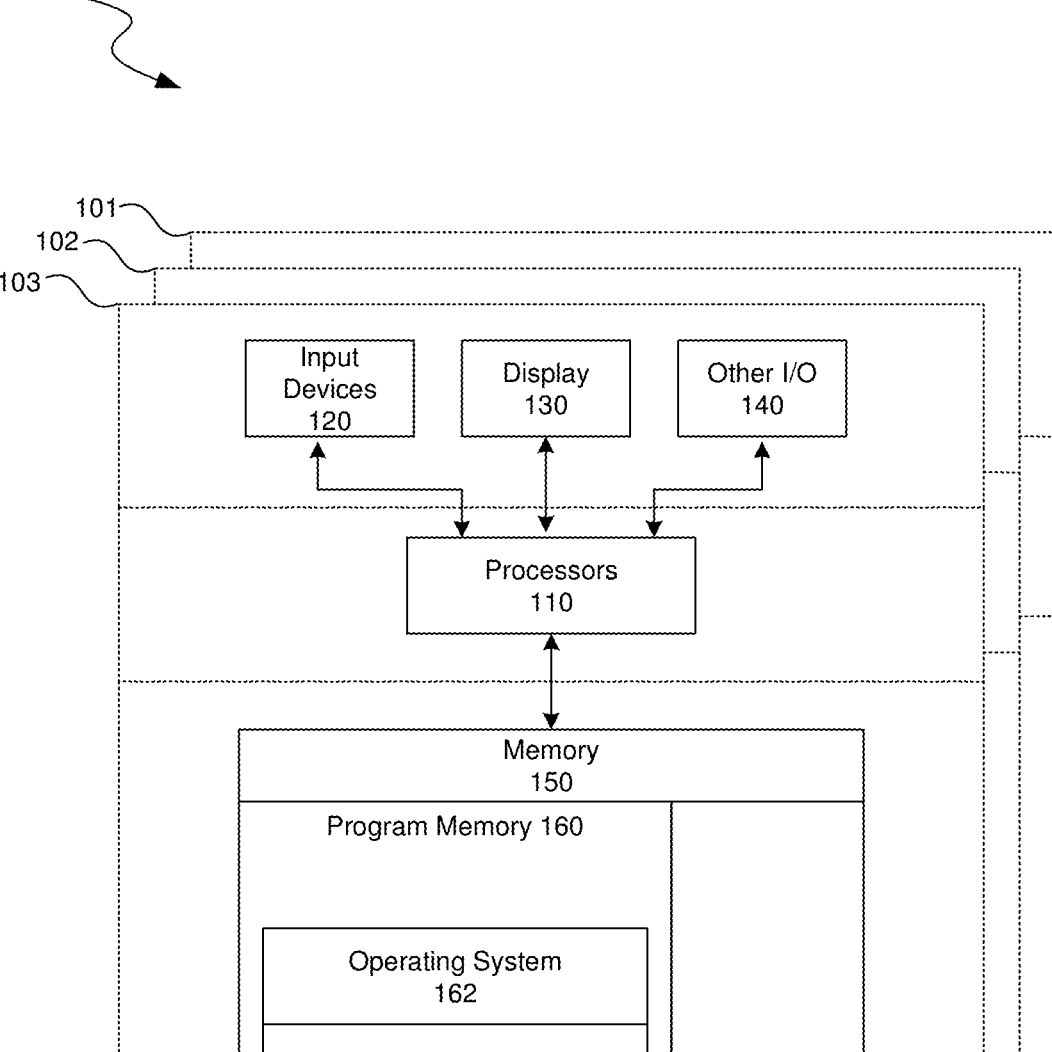
FIG. 1 is a block diagram illustrating an overview of devices on which some implementations of the present technology can operate.

Aspects of the present disclosure perform accurate position and orientation for artificial reality input devices (e.g., hand/wrist/ankle input devices), even when the devices are moved beyond the field of view of cameras in a head mounted display. Implementations use raw inertial motion unit (IMU) samples and use a physics model to integrate acceleration to get velocity and further integrate velocity to get position when the input device is "visible". Implementations further use a human body kinematics model using a Kalman filter when the input device is not visible ("occluded"), so that the position regulates to the "last known good" position, and the velocity regulates to the "rotation-inferred" velocity. Implementations, when there is direct line-of-sight between cameras and the input device, can use the Kalman filter to estimate the input device's position, where IMU samples are processed for "dead-reckoning", and a "camera-based tracking system" provides high-confidence measurements to correct dead-reckoning errors.

Implementations allow an artificial reality system to use a pure IMU or vision-based controller tracking system when the confidence value of that tracking system is high, but when the confidence value of that tracking system is lower, the system can use a last known position from that tracking system as an anchor which is modified according to IMU data, where the amount of modification is correlated (logarithmically) to the confidence factor. Thus, in addition to using cameras/video, implementations use other data based on the reality that the input device is attached to the user's hand or appendage, so there are limits to its location. When the "vision" technique is not adequate, because the input device is beyond the field of view of the head mounted display, implementations infer the position and velocity of the input device using IMU data and a model.

Implementations track an artificial reality input device by receiving, for the input device, video tracking data based on input from a camera and IMU data input from an IMU. Implementations generate, from the video tracking data, a video tracking position and a video tracking velocity, generate, from the IMU data, an IMU orientation and an IMU linear acceleration, and generate, from the IMU orientation and the IMU linear acceleration, an IMU linear velocity. Implementations determine if the video tracking position and the video tracking velocity have a confidence value above a threshold. When the video tracking position and the video tracking velocity confidence value is above the threshold, implementations input the video tracking position, the video tracking velocity, the IMU orientation and the IMU linear acceleration to a Kalman filter. When the video tracking position and the video tracking velocity confidence value is not above the threshold, implementations input a last known video tracking position, the IMU linear velocity, the IMU orientation and the IMU linear acceleration to the Kalman filter. Implementations then determine, by the Kalman filter, for the input device, a current bias, a current velocity and a current position.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Many current implementations of tracking XR controllers utilize embedded light-emitting diode (LED) devices (e.g., in an infrared spectrum) that can be tracked by cameras on the head mounted display or base station. However, there is a desire to reduce the amount of LEDs needed and reduce the size of the head mounted display, which would reduce the number of cameras in the display or cameras on a base station. These changes would make tracking of the XR controllers and other input devices more difficult using current techniques. Further, these "pure camera" or "vision" techniques of tracking have difficulty with blurring when the controllers are moved quickly and have difficulty when the view of the controllers are occluded.

In contrast, implementations improve the tracking of XR controllers and other XR input devices through the use of raw IMU samples and a physics model to integrate acceleration to get velocity and further integrate velocity to get position when the input device is "visible". Implementations further use a human body kinematics model using a Kalman filter when the input device is not visible/"occluded", so that the position regulates to the "last known good" position, and the velocity regulates to the "rotation-inferred" velocity.

Several implementations are discussed below in more detail in reference to the figures. FIG. 1 is a block diagram illustrating an overview of devices on which some implementations of the disclosed technology can operate. The devices can comprise hardware components of a computing system 100 that perform accurate position and orientation for XR devices, even when the devices are moved beyond the field of view of tracking cameras. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random-access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, motion-model based tracking system 164, and other application programs 166. Memory 150 can also include data memory 170 that can include, e.g., data used for tracking input devices, such as previous locations, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
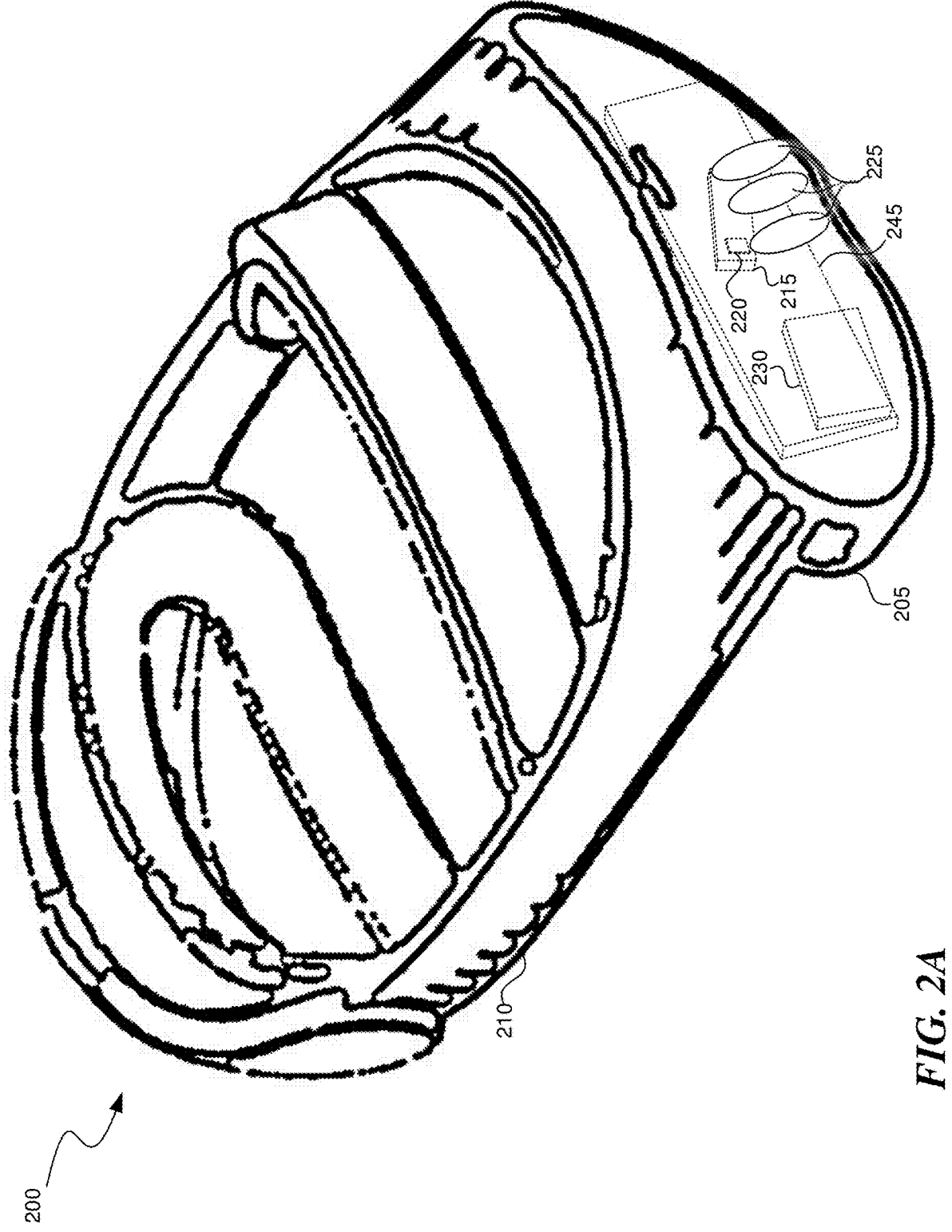
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
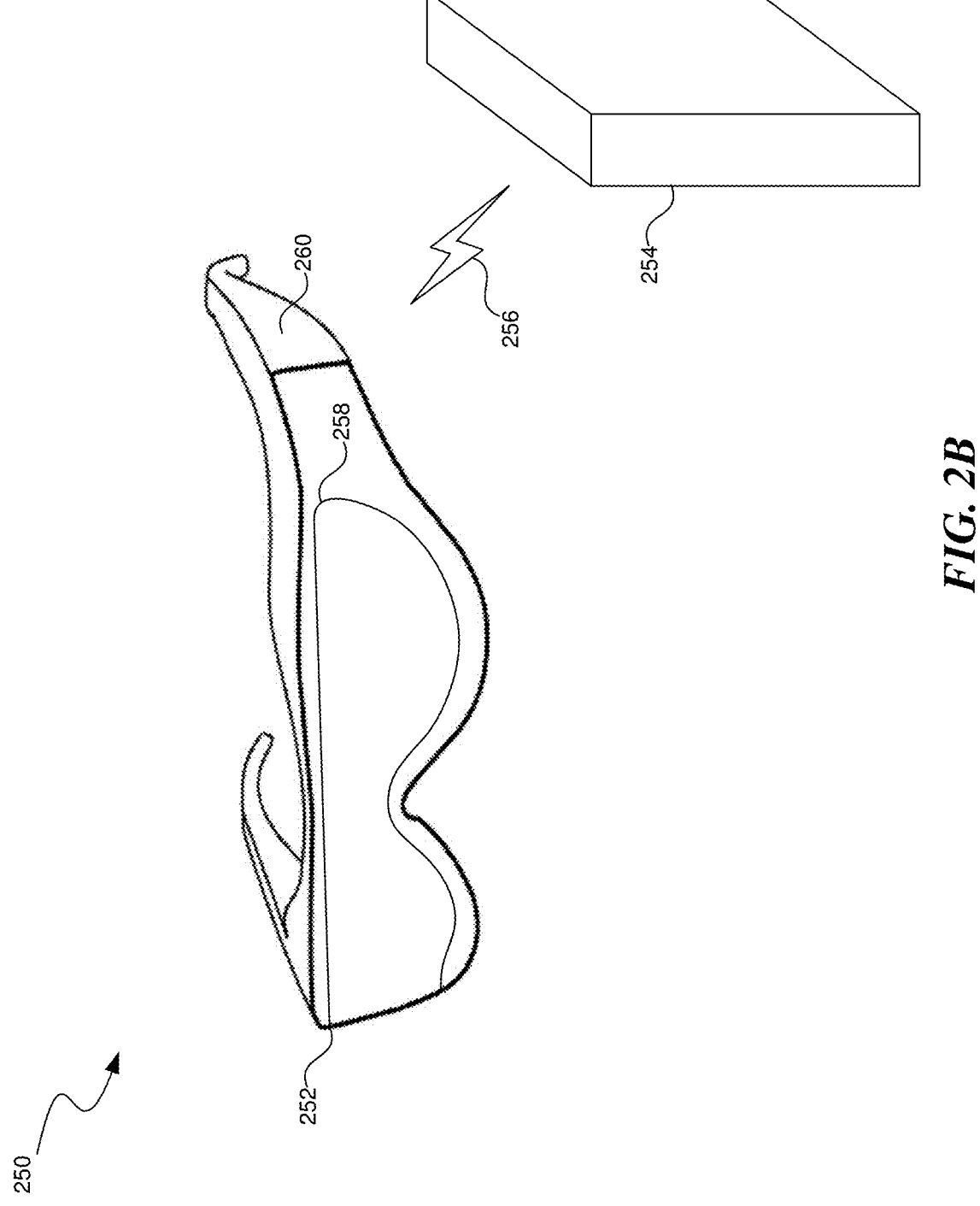
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHZ link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
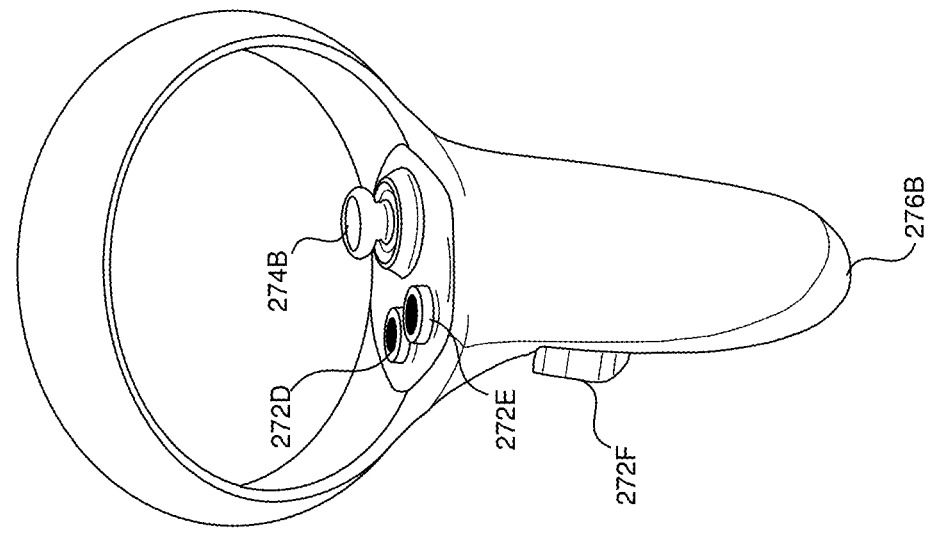
FIG. 2C is a wire diagram illustrating controllers which, in some implementations, a user can hold in one or both hands to interact with an artificial reality environment.
Figure 2C:
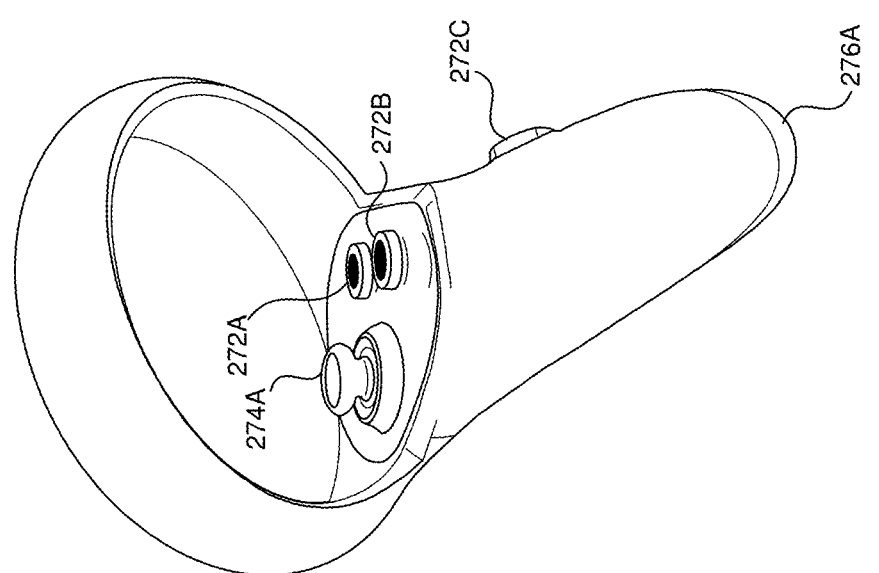
Figure 2C:
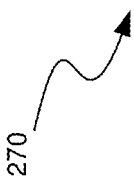

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
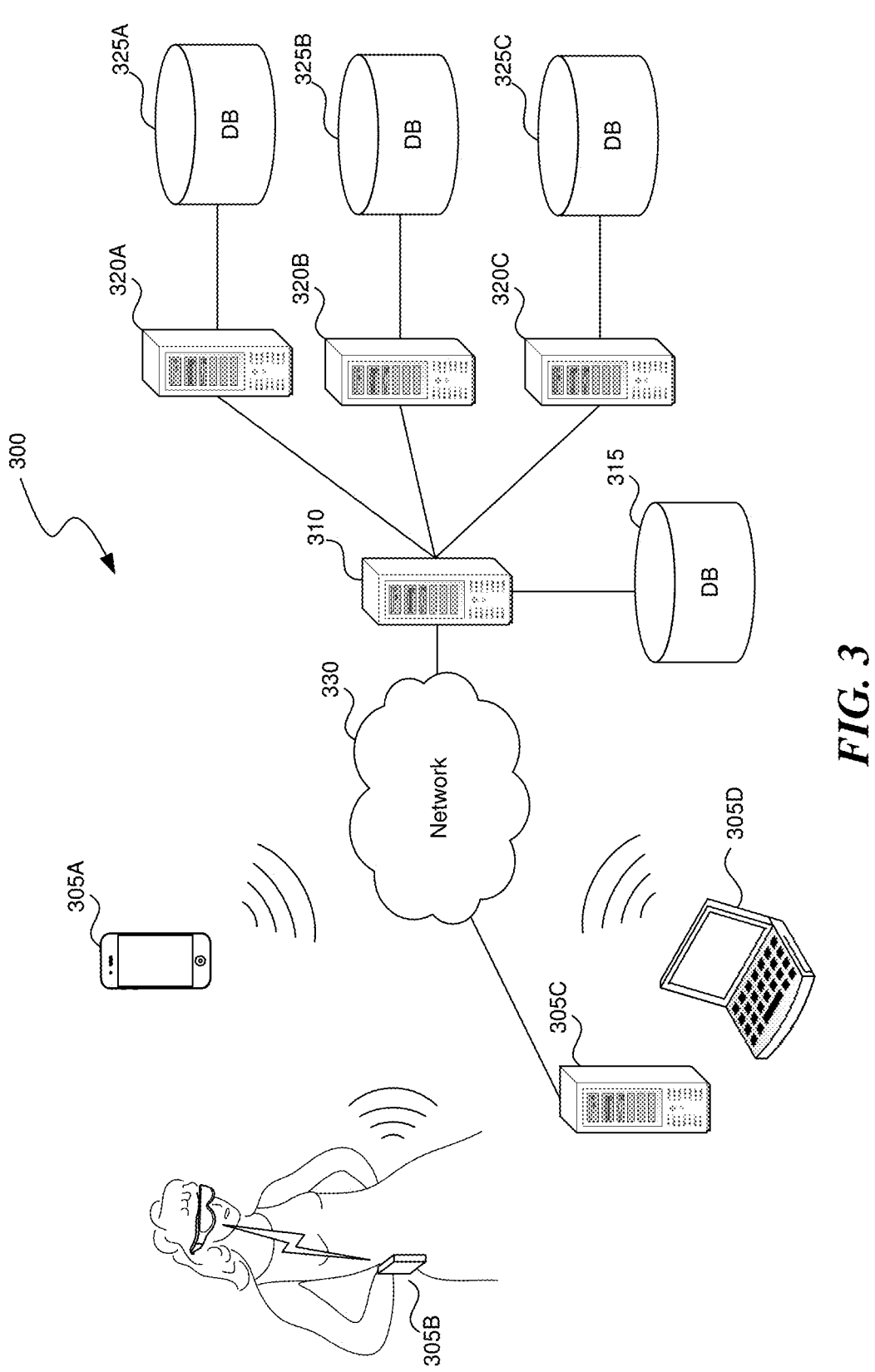
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
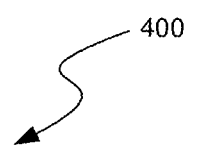
FIG. 4 is a block diagram illustrating components which, in some implementations, can be used in a system employing the disclosed technology.
Figure 4:
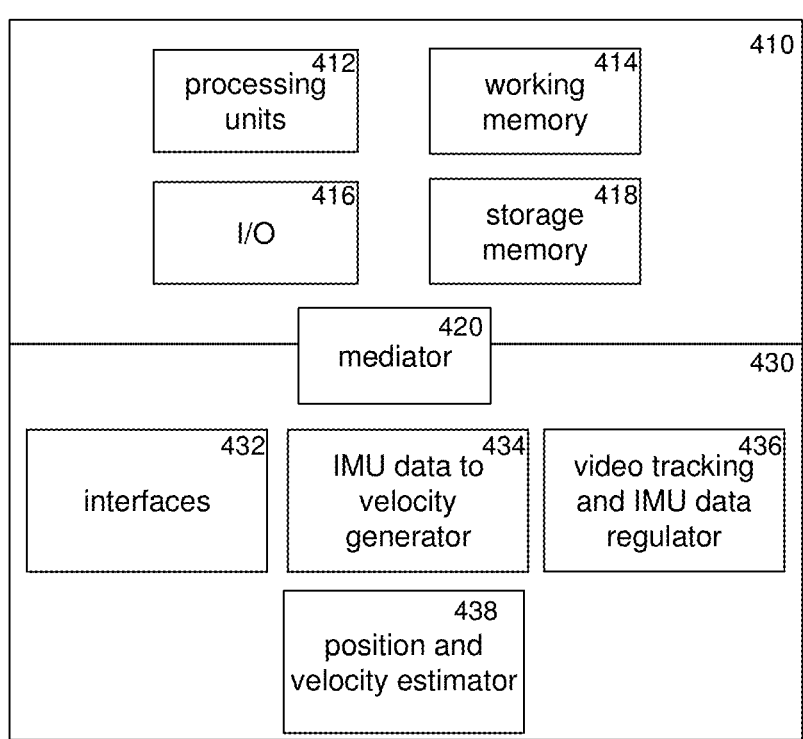

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for input device tracking. Specialized components 430 can include an IMU data to velocity generator 434, video tracking and IMU data regulator 436 and a position and velocity estimator 438 (e.g., a Kalman filter), and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

IMU data to velocity generator 434 can estimate/generate linear velocity from the IMU data corresponding to the input device. The linear velocity is estimated relative to the instantaneous rotation center of the IMU. Additional details on generating velocity data from IMU data are provided below in relation to blocks 806 and 808 of FIG. 8.

Video tracking and IMU data regulator 436 can determine what position data and velocity data corresponding to the input device is provided to a Kalman filter based on a determination on the reliability of the video tracking data. The reliability of the video tracking data can be based on whether the input device is within view of HMD cameras. Additional details on regulating video tracking and IMU data are provided below in relation to blocks 810, 812 and 814 of FIG. 8.

Position and velocity estimator 438 can determine for the input device its current bias, current velocity and current position. Position and velocity estimator 438 can be implemented by a Kalman filter. Additional details on estimating position and velocity are provided below in relation to block 816 of FIG. 8.

Those skilled in the art will appreciate that the components illustrated in FIGS. 1-4 described above, and in each of the flow diagrams discussed below, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Figure 5:
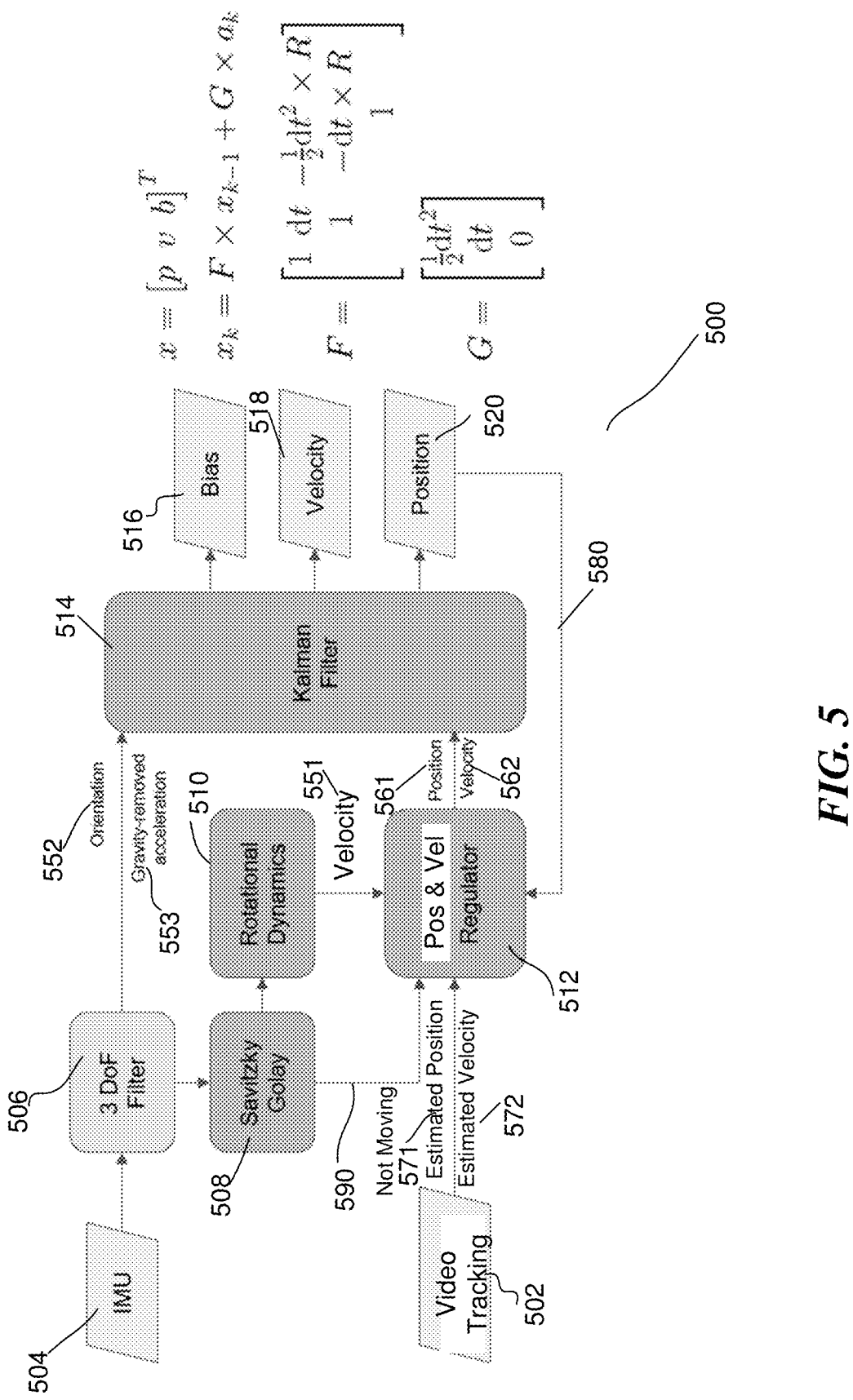
FIG. 5 is a block diagram of an XR input device tracking system in accordance with implementations of the disclosed technology.

FIG. 5 is a block diagram of an XR input device tracking system 500 in accordance with implementations of the disclosed technology. System 500 relies on two sources of input data. Video tracking 502 is any external source of tracking data, which includes camera-based vision, including the cameras on the HMD, or LEDs on the controller, or any combination of cameras and LEDs. Video tracking 502 can be implemented by a hybrid tracking pipeline ("HTP") or any other type of external positional tracking system. IMU 504 is the IMU data from the XR controller or other XR input device. IMU 504 data is used to infer/model the velocity and position of the input device when video tracking data cannot be used because, for example, the input device is no longer trackable in the field of view ("FOV") of the HMD (e.g., due to an occluded view of the input device). The modeling implemented by system 500 assumes that any smooth trajectory can be approximated by arcs and straight lines, that human arm movement is mostly arcs, and that users prefer an algorithm that approximately tracks their movement over one that fails to track.

System 500 infers linear velocity from rotational dynamics using a 3 degrees of freedom ("DoF") filter 506 (also referred to as an "orientation filter" or "attitude filter"), a Savitzky-Golay filter 508 and a rotational dynamics module 510. The 3 DoF filter 506 infers the orientation 552 and the gravity-removed acceleration 553 from the IMU data. The IMU data 504 includes the linear acceleration and angular velocity. The output of rotational dynamics module 510 is the linear velocity 551, using the assumption that the movement is mostly arcs. However, this assumption results in inaccuracies, so a Kalman filter 514 is implemented for smoothing purposes since the linear velocity 551, by itself, includes errors. Kalman filtering, also known as linear quadratic estimation (LQE), is an algorithm that uses a series of measurements observed over time, including statistical noise and other inaccuracies, and produces estimates of unknown variables that tend to be more accurate than those based on a single measurement alone, by estimating a joint probability distribution over the variables for each timeframe.

Savitzky-Golay filter 508 separates/filters user intentional movement from other noise and jerks. Filter 508 performs smoothing and differentiation filtering on a sliding window. In some implementations, the window size is 100 ms, which introduces fixed latency of ½ the window size (e.g., 50 ms). Filter 508 extracts human movement: 98% human motion information <10 Hz in FFT spectrum. For smoothing, filter 508 assumes a 4th order polynomial for generalized position, a 3rd order for velocity and a 2nd order for acceleration, which is used to determine linear acceleration and angular velocity. For differentiation, filter 508 computes derivatives by differentiating corresponding polynomials, which is used for angular acceleration. Savitzky-Golay filter 508 can also output a "not moving" signal 590 when it is determined, from the IMU data 504, that the controller is not moving.

Input to Kalman filter 514 is the device orientation 552 and linear acceleration 553 (both inferred from IMU 504 by filter 506) and the linear velocity 551 generated by rotational dynamics module 510. The output estimated by Kalman filter 514 is a linear position 520, a linear velocity 518 and an accelerometer bias 516.

System 500 further includes a position and velocity regulator 512. When there are "reliable" measurements from video tracking 502, regulator 512 passes through, to filter 514, position 561 and velocity 562, which are the same as estimated position 571 and estimated velocity 572 from video tracking 502. In this case, position 520 will generally converge, via 580, to be the same as the position of video tracking 502.

Regulator 512 determines whether the measurements from video tracking 502 are reliable based on a confidence level. Video tracking 502 outputs an estimated position 571 and an estimated velocity 572, as well as a corresponding confidence level. For example, video tracking 502 can implement an internal Kalman filter, which would produce an "uncertainty" (i.e., covariance) in connection of the position and velocity, and the confidence could be defined as the inverse of that uncertainty (i.e., higher uncertainty relates to lower confidence, and vice versa). Example implementations further include additional "sanity check" video tracking measurements, in case the confidence levels it produces are not reliable themselves (e.g., Kalman filter 514 becoming "over confident"). One example is to check the Mahalanobis distances between the video tracking estimates and velocity 518 and position 520, and reject incoming measurements if the Mahalanobis distances exceeds predefined thresholds.

Figure 6:
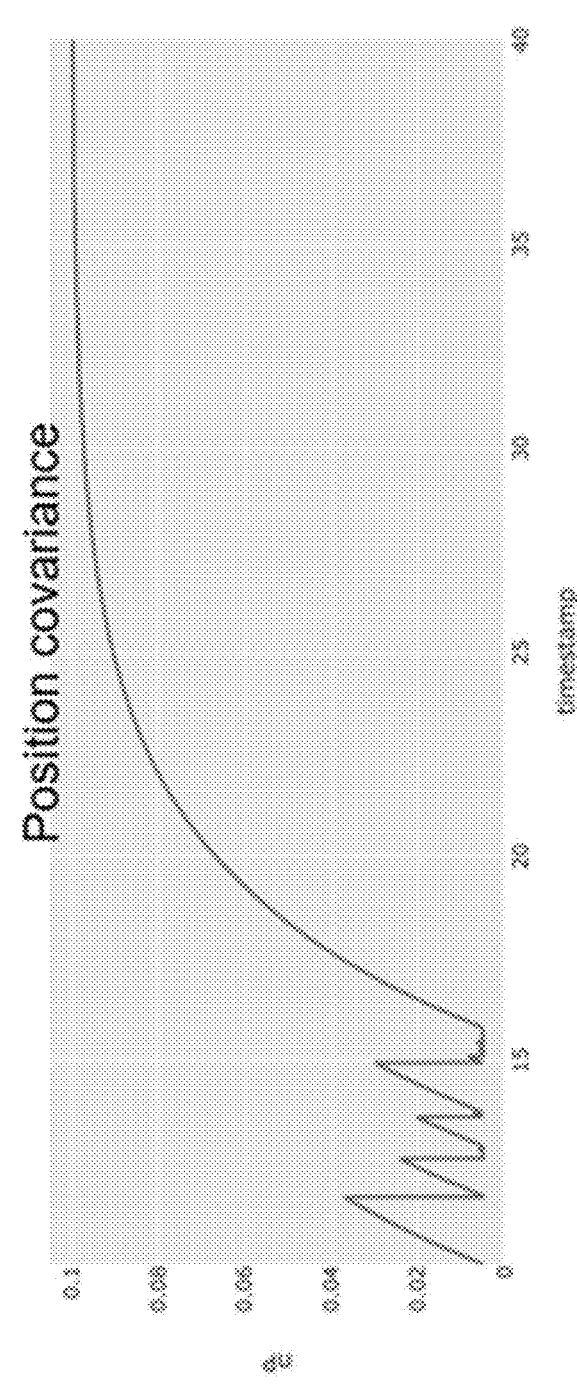
FIG. 6 graphically illustrates that stiffness is the inverse of covariance.

Rotational dynamics module 510 only outputs velocity 551 in example implementations. When video tracking 502 data is reliable (e.g., confidence level greater than a predefined threshold), regulator 512 uses video tracking estimated position 571 and estimated velocity 572 as input to filter 514. When video tracking 502 data is not reliable, regulator 512 uses the last known position from video tracking 502, since only velocity and not position is output from module 510, as an anchor, but with low confidence and uses a "spring" effect to always return to the last known position using anchoring with some stiffness of the spring, represented by the "covariance" or the "confidence level." FIG. 6 graphically illustrates that stiffness is the inverse of covariance. The higher the covariance, the less confident about the position. The "spring" allows for movement, but prevents a "flying away" indefinitely from the last known position.

Figures 7A, 7B:
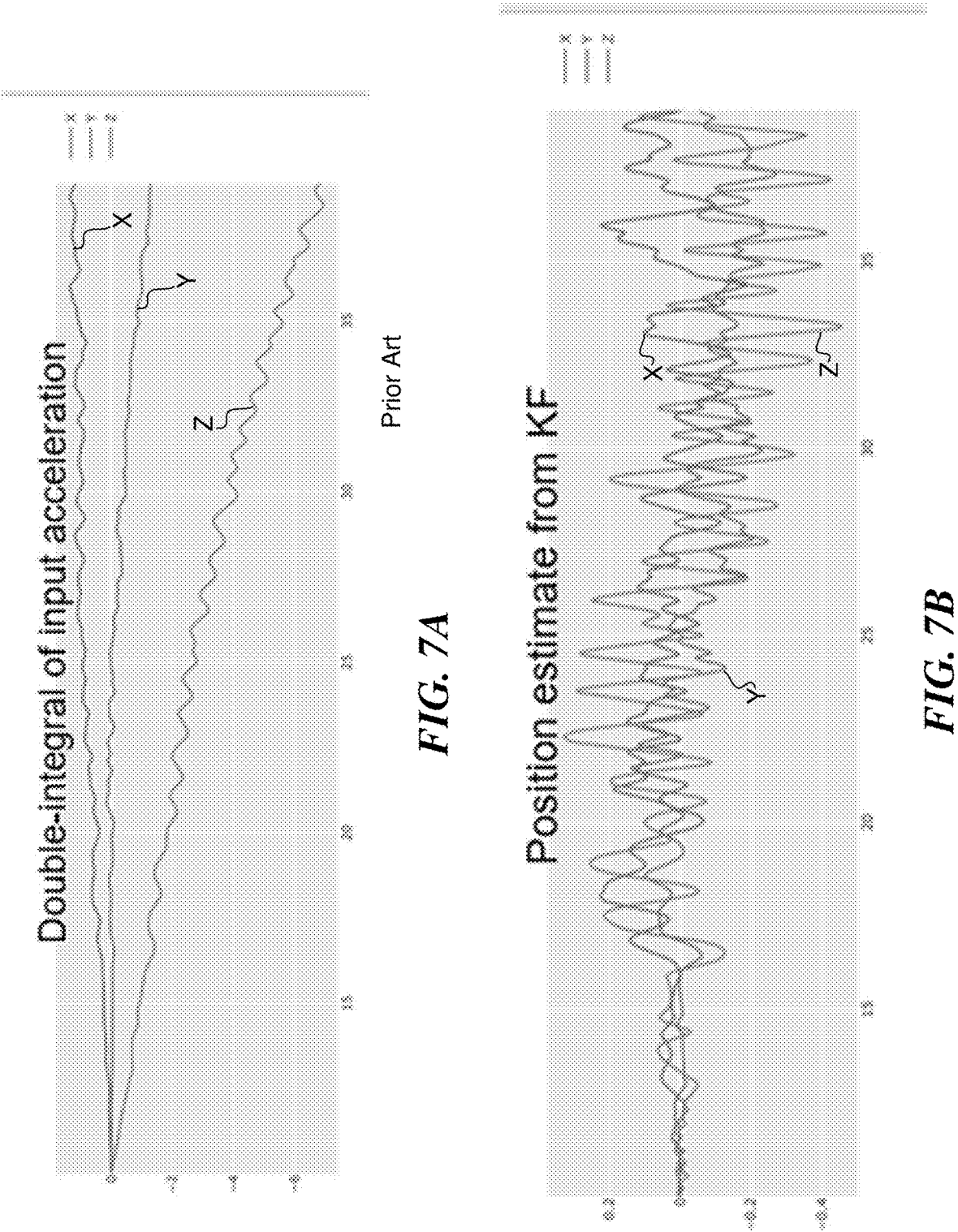
FIG. 7A illustrates a position estimate of an XR input device using known techniques of relying on IMU data only and a relatively simple double integral of input acceleration.
FIG. 7B illustrates a position estimate of an XR input device using the system in accordance to implementations of the invention.

In general, regulator 512 operates to output target position 561, target velocity 562, and corresponding covariance by applying the following rules:

Target position update rule—
    When Video tracking is tracking: snap to the video tracking position
    When Device becomes stationary: anchor at the current Kalman filter position estimate
Target position covariance update rule—
    When Video tracking is tracking: snap to the video tracking covariance
    When Device is stationary: snap to predefined value
    When Device is moving: use exponential ramp until hitting maximum covariance
Target velocity and covariance update rule—
    When Video tracking is tracking: snap to the video tracking velocity and covariance
    When Device is stationary: use zero-velocity with predefined covariance
    When Device is moving: use rotation-inferred velocity with predefined covariance
In implementations, regulator 512 further provides:
Small covariance when stationary—
    Users may see constant offset but not drift
    Anchors to Kalman filter position when becoming stationary
        Cannot recover from accumulated error
        Similar behavior to: marginalization of constraint graphs
Growing covariance when starts to move.
    Users may feel movement is reduced
    Good for "fine adjustment", like mouse cursor
Large covariance if moving continuously
    Users feel movement is related but may observe overshoot/undershoot and/or mild drift
    Very gentle pull to the anchor position→suppresses significant drift
    Stronger pull→no long-term drift, but some short-term drift FIG. 7A illustrates a position estimate of an XR input device using known techniques of relying on IMU data only and a relatively simple double integral of input acceleration. As shown, over time on the x-axis, the x, y and z positions rapidly drift/diverge/flyaway, indicating inaccuracy of the estimated position.

In contrast, FIG. 7B illustrates a position estimate of an XR input device using system 500 in accordance to implementations of the invention. As shown, the x, y and z positions do not drift over time as with the known solutions, indicating a more accurate position estimate.

Although example implementations can use an XR controller, such as controller 270, the functionality can track other XR input devices that include an IMU and are anchored to the user (e.g., a smart watch, an ankle bracelet, etc.). Example implementations can also be an IMU only tracking system, without HTP, as long as there is also an external positional tracking system to estimate position and optionally velocity.

Figure 8:
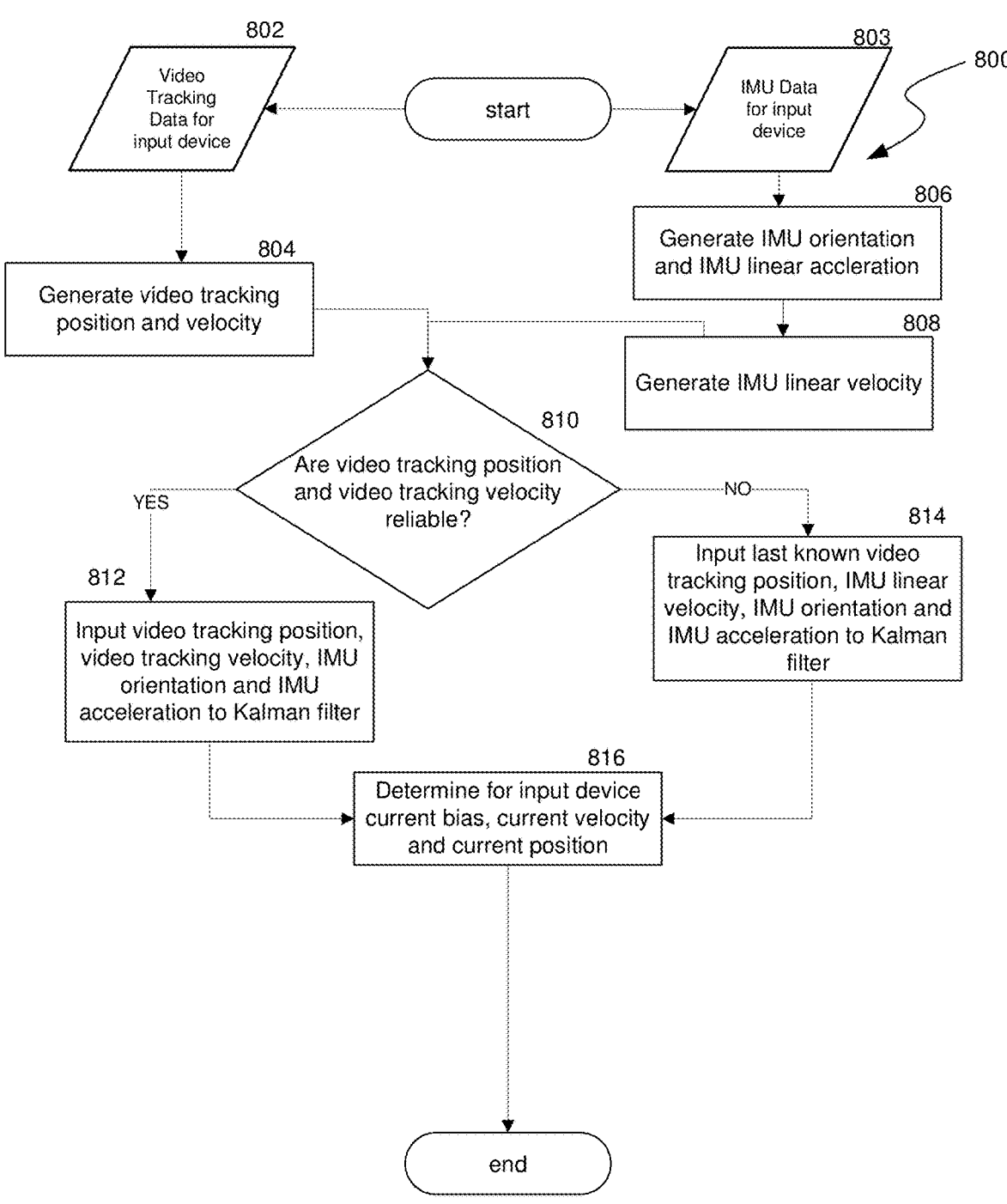
FIG. 8 is a flow diagram illustrating a process used in some implementations for tracking an XR input controller.

FIG. 8 is a flow diagram illustrating a process used in some implementations for tracking an XR input controller.

Process 800 receives HTP data at 802 (e.g., video tracking 502) and IMU data at 803 (e.g., IMU 504). The HTP data is any external source of tracking data, which includes camera-based vision, including the cameras on the HMD, or LEDs on the controller, or any combination of cameras and LEDs. The IMU data is generated from the IMU in the controller or other input device.

At block 804, from the video tracking data, a video tracking estimated position 571 and video tracking estimated velocity 572 is generated. The video tracking data is a tracking of the movement of the input device, which directly provides the velocity and position.

At block 806, from the IMU data, an IMU orientation 552 and IMU linear acceleration 553 is generated. A 3 DoF filter 506 infers the IMU orientation and the gravity-removed linear acceleration from the IMU data.

At block 808, an IMU linear velocity 551 is generated from the IMU orientation and the IMU linear acceleration. The IMU linear velocity is based on rotational dynamics using 3DoF filter 506, Savitzky-Golay filter 508 and rotational dynamics module 510. The output of rotational dynamics module 510 is the linear velocity 551, using the assumption that the movement of the input device is mostly arcs.

At block 810, it is determined if the video tracking data (i.e., video tracking estimated position 571 and video tracking estimated velocity 572) is reliable. For example, it is determined if the video tracking data has a confidence value above a threshold. The confidence value is related to a covariance, and is small when the input device is stationary, growing when the input device starts to move, and large if the input device is moving continuously.

If yes at block 810, at block 812 the video tracking position 571, video tracking velocity 572, IMU orientation 552 and IMU linear acceleration 553 are input to Kalman filter 514.

If no at block 810, at block 814 the last known video tracking position 520, IMU linear velocity 551, IMU orientation 552 and IMU linear acceleration 553 are input to Kalman filter 514.

At block 816, Kalman filter 514 determines the current bias 516, velocity 518 and position 520 of the input device, which provides the current tracking of the input device.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for tracking an artificial reality input device, the method comprising:
   receiving, for the input device, video tracking data and inertial motion unit (IMU) data based on motion input;
   generating, from the video tracking data, a video tracking position and a video tracking velocity;
   generating, from the IMU data, an IMU orientation and an IMU linear acceleration;
   generating, from the IMU orientation and the IMU linear acceleration, an IMU linear velocity;
   determining that the video tracking position and the video tracking velocity is below a reliability threshold;

in response to the determining, inputting a last known video tracking position, the IMU linear velocity, the IMU orientation and the IMU linear acceleration to a Kalman filter; and
   determining, by the Kalman filter and for the input device, a current bias, a current velocity and a current position for the input device.

2. The method of claim 1, further comprising:
   determining that the video tracking position and the video tracking velocity has risen above the reliability threshold; and
   in response to the determining that the video tracking position and the video tracking velocity has risen above the reliability threshold, inputting the video tracking position, the video tracking velocity, the IMU orientation and the IMU linear acceleration to the Kalman filter.

3. The method of claim 1, wherein the determining that the video tracking position and the video tracking velocity is below the reliability threshold comprises determining that a confidence level, generated by a second Kalman filter, is below the threshold.

4. The method of claim 3, further comprising evaluating the confidence level based on a Mahalanobis distance.

5. The method of claim 1, wherein the video tracking data is generated based on light, from a light-emitting diode, being received by a camera.

6. The method of claim 1, wherein the IMU linear acceleration is generated from a rotational dynamics module that assumes movement of the input device comprises mostly arcs.

7. The method of claim 1, further comprising determining, using a Savitzky-Golay filter, that the input device is being intentionally moved by a user.

8. The method of claim 1, wherein the generating, from the IMU data, the IMU orientation and the IMU linear acceleration comprises using a three degrees of freedom filter.

9. The method of claim 1, wherein the determining that the video tracking position and the video tracking velocity is below the reliability threshold is based on the input device being occluded from view of a camera.

10. A computer-readable storage medium storing instructions that, when executed by a computing system, cause the computing system to perform a process for tracking an artificial reality input device, the process comprising:
   receiving, for the input device, video tracking data and inertial motion unit (IMU) data based on motion input;
   generating, from the video tracking data, a video tracking position and a video tracking velocity;
   generating, from the IMU data, an IMU orientation and an IMU linear acceleration;
   generating, from the IMU orientation and the IMU linear acceleration, an IMU linear velocity;
   determining that the video tracking position and the video tracking velocity is below a reliability threshold;
   in response to the determining, inputting a last known video tracking position, the IMU linear velocity, the IMU orientation and the IMU linear acceleration to a Kalman filter; and
   determining, by the Kalman filter and for the input device, a current bias, a current velocity and a current position for the input device.

11. The computer-readable storage medium of claim 10, wherein the process comprises:

determining that the video tracking position and the video tracking velocity has risen above the reliability threshold; and in response to the determining that the video tracking position and the video tracking velocity has risen above the reliability threshold, inputting the video tracking position, the video tracking velocity, the IMU orientation and the IMU linear acceleration to the Kalman filter.

12. The computer-readable storage medium of claim 10, wherein the determining that the video tracking position and the video tracking velocity is below the reliability threshold comprises determining that a confidence level, generated by a second Kalman filter, is below the threshold.

13. The computer-readable storage medium of claim 12, wherein the process further comprises evaluating the confidence level based on a Mahalanobis distance.

14. The computer-readable storage medium of claim 10, wherein the video tracking data is generated based on light, from a light-emitting diode, being received by a camera.

15. The computer-readable storage medium of claim 10, wherein the IMU linear acceleration is generated from a rotational dynamics module that assumes movement of the input device comprises mostly arcs.

16. The computer-readable storage medium of claim 10, wherein the process further comprises determining, using a Savitzky-Golay filter, that the input device is being intentionally moved by a user.

17. The computer-readable storage medium of claim 10, wherein the generating, from the IMU data, the IMU orientation and the IMU linear acceleration comprises using a three degrees of freedom filter.

18. The computer-readable storage medium of claim 10, wherein the determining that the video tracking position and the video tracking velocity is below the reliability threshold is based on the input device being occluded from view of a camera.

19. A computing system for tracking an artificial reality input device, the computing system comprising:

one or more processors; and one or more memories storing instructions that, when executed by the one or more processors, cause the computing system to perform a process comprising:

receiving, for the input device, video tracking data and inertial motion unit (IMU) data based on motion input;

generating, from the video tracking data, a video tracking position and a video tracking velocity;

generating, from the IMU data, an IMU orientation and an IMU linear acceleration;

generating, from the IMU orientation and the IMU linear acceleration, an IMU linear velocity;

determining that the video tracking position and the video tracking velocity is below a reliability threshold;

in response to the determining, inputting a last known video tracking position, the IMU linear velocity, the IMU orientation and the IMU linear acceleration to a Kalman filter; and determining, by the Kalman filter and for the input device, a current bias, a current velocity and a current position for the input device.

20. The computing system of claim 19, wherein the process further comprises:

determining that the video tracking position and the video tracking velocity has risen above the reliability threshold; and in response to the determining that the video tracking position and the video tracking velocity has risen above the reliability threshold, inputting the video tracking position, the video tracking velocity, the IMU orientation and the IMU linear acceleration to the Kalman filter.

\* \* \* \* \*